United States Patent
Freitag et al.

(10) Patent No.: US 7,652,855 B2
(45) Date of Patent: Jan. 26, 2010

(54) MAGNETIC SENSOR WITH EXTENDED FREE LAYER AND OVERLAID LEADS

(75) Inventors: James Mac Freitag, Sunnyvale, CA (US); David Eugene Heim, Redwood City, CA (US); Kuok San Ho, Redwood City, CA (US); Wipul Pemsiri Jayasekara, Los Gatos, CA (US); Kim Y. Lee, Fremont, CA (US); Tsann Lin, Saratoga, CA (US); Jyh-Shuey Lo, San Jose, CA (US); Mustafa Michael Pinarbasi, Morgan Hill, CA (US); Ching Hwa Tsang, Sunnyvale, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 449 days.

(21) Appl. No.: 11/595,186

(22) Filed: Nov. 9, 2006

(65) Prior Publication Data

US 2008/0112090 A1   May 15, 2008

(51) Int. Cl.
*G11B 5/39* (2006.01)
(52) U.S. Cl. .................... 360/322; 360/324.12
(58) Field of Classification Search ............. 360/322, 360/324.12, 324.1, 324.11, 324.2
See application file for complete search history.

(56) References Cited

U.S. PATENT DOCUMENTS

| | | | |
|---|---|---|---|
| 5,930,087 A * | 7/1999 | Brug et al. | 360/324.2 |
| 6,344,953 B1 * | 2/2002 | Kautzky et al. | 360/322 |
| 6,451,215 B1 | 9/2002 | Shimazawa et al. | |
| 6,469,879 B1 | 10/2002 | Redon et al. | |
| 6,529,353 B2 | 3/2003 | Shimazawa | |
| 6,556,392 B1 * | 4/2003 | Mao et al. | 360/324.12 |
| 6,704,176 B2 * | 3/2004 | Shukh et al. | 360/324.12 |
| 6,729,014 B2 | 5/2004 | Lin et al. | |
| 6,735,850 B1 | 5/2004 | Gibbons et al. | |
| 6,741,429 B1 | 5/2004 | Baglin et al. | |
| 6,744,607 B2 * | 6/2004 | Freitag et al. | 360/322 |
| 6,754,056 B2 | 6/2004 | Ho et al. | |
| 6,760,966 B2 | 7/2004 | Wang et al. | |

(Continued)

FOREIGN PATENT DOCUMENTS

JP    2000276717 A1    10/2000

(Continued)

*Primary Examiner*—Jefferson Evans
(74) *Attorney, Agent, or Firm*—G. Marlin Knight (57) ABSTRACT

A lead overlay design of a magnetic sensor is described with sensor and free layer dimensions such that the free layer is stabilized by the large demagnetization field due to the shape anisotropy. In one embodiment the giant magnetoresistive (GMR) effect under the leads is destroyed by removing the antiferromagnetic (AFM) and pinned layers above the free layer. The overlaid lead pads are deposited on the exposed spacer layer at the sides of the mask that defines the active region. In other embodiment a layer of electrically insulating material is deposited over the sensor to encapsulate it and thereby insulate it from contact with the hardbias structures. Various embodiments with self-aligned leads are also described. In a variation of the encapsulation embodiment, the insulating material is also deposited under the lead pads so the electrical current is channeled through the active region of the sensor and sidewall deposited lead pads.

17 Claims, 9 Drawing Sheets

U.S. PATENT DOCUMENTS

| | | |
|---|---|---|
| 6,762,916 B2 | 7/2004 | Aoki et al. |
| 6,778,363 B2 | 8/2004 | Meguro et al. |
| 6,791,804 B2 | 9/2004 | Aoki et al. |
| 6,807,033 B2 | 10/2004 | Zhu |
| 6,833,982 B2 | 12/2004 | Jayasekara |
| 6,910,259 B1 * | 6/2005 | Lin et al. ............. 29/603.08 |
| 7,089,648 B2 * | 8/2006 | Meguro et al. ......... 29/603.07 |
| 7,126,796 B2 * | 10/2006 | Lin ........................ 360/322 |
| 2002/0154458 A1 | 10/2002 | Lin et al. |
| 2003/0011943 A1 | 1/2003 | Webb et al. |
| 2003/0090843 A1 * | 5/2003 | Shukh et al. ........... 360/324.12 |
| 2003/0202295 A1 | 10/2003 | Wang et al. |
| 2004/0027730 A1 | 2/2004 | Lille |
| 2004/0160709 A1 | 8/2004 | Lin et al. |
| 2005/0007706 A1 | 1/2005 | Dovek et al. |
| 2007/0047158 A1 * | 3/2007 | Hayashi et al. ........ 360/324.11 |

FOREIGN PATENT DOCUMENTS

| | | |
|---|---|---|
| JP | 2001067626 A1 | 3/2001 |
| JP | 2004006494 A1 | 1/2004 |

* cited by examiner

MAGNETIC SENSOR WITH EXTENDED FREE LAYER AND OVERLAID LEADS

FIELD OF THE INVENTION

The invention relates to thin film magnetic transducers for sensing magnetic fields in magnetic recording media and more particularly to magnetic transducers used in magnetic disk drives.

BACKGROUND OF THE INVENTION

Figure 1:
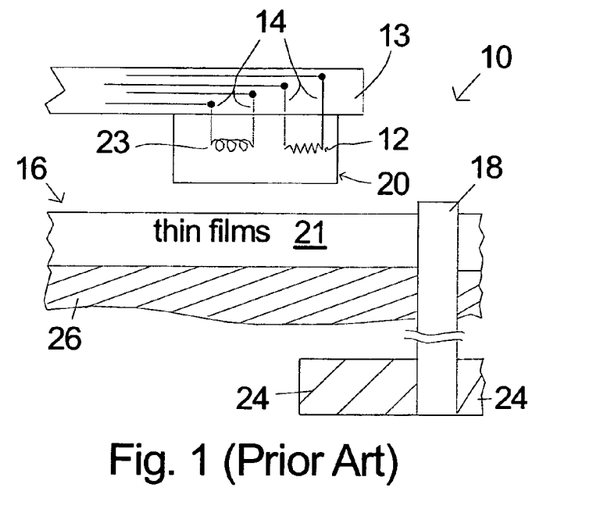
FIG. 1 is a symbolic illustration of selected components in a prior art disk drive.

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) in the magnetic medium included in the thin films 21 and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The magnetic domains in the media can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole and any shields are the primary factors in determining the track width.

Figure 2:
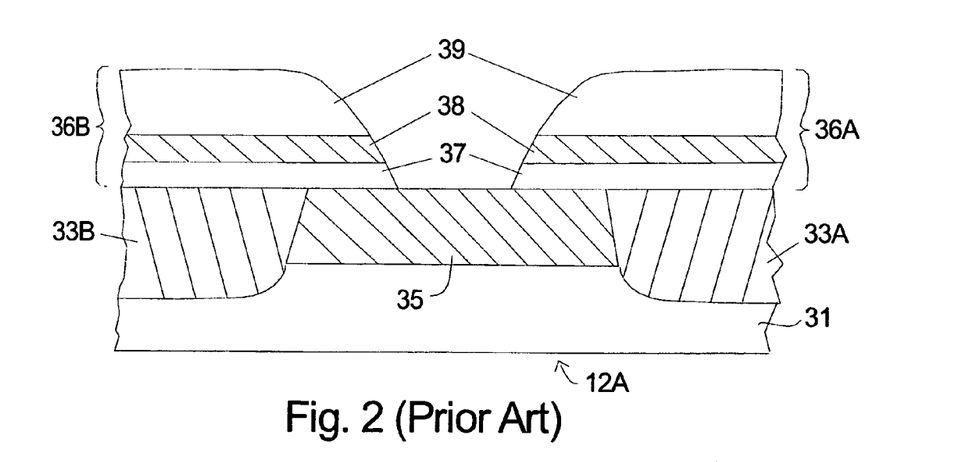
FIG. 2 is a symbolic illustration of a section, taken parallel to the air-bearing surface, of a prior art read sensor with overlaid leads.

Lead overlay designs for read sensors provide an advantage in improved stability and amplitude. The primary problem is the wide effective sensor width. In this design, track width controlled by the separation of the electrically conductive leads on top of the sensor is smaller than the full width of the sensor material. The lead overlay design moves the sensor free layer edges away from the active sensor region edges. A prior art spin valve head 12A with overlaid leads is illustrated in FIG. 2 in a section view taken parallel to the air bearing surface. Since the wafer is cut to expose the air-bearing surface, the view shown can also be described as being perpendicular to the surface of the wafer. The leads 36a, 36b as shown in this particular embodiment include three sublayers: tantalum 37, chromium 38 and rhodium 39. The tantalum and chromium layers serve as seed layers for the rhodium. The leads are deposited in contact with the top surface of the spin valve sensor 35 and the hard bias structures 33a, 33b. The gap layer 31 underlies the two hard bias structures 33a, 33b and the sensor 35. The hard bias structures 33a, 33b are shown as a single element even though they include more than one layer, e.g., a chromium layer (not shown) followed by a CoPtCr layer (not shown). The spin valve 35 is also illustrated as a single entity for simplicity even though it includes several layers.

In published U.S. patent application 20040257713 by Pinarbasi, et al., Dec. 23, 2004, a lead overlay magnetoresistive sensor is described with leads having substantially vertical end walls to accentuate sense current near the ends of the leads. Insulating layers isolate the hard bias layers from the path of the sense current. After a first photoresist liftoff structure has been removed, a second layer of photoresist is formed and patterned. The second layer of photoresist does not have the usual undercut liftoff structure. Instead, the second layer of photoresist has substantially vertical walls. Lead material may be conveniently chosen from low resistance, substantially inert electrical conductors such as rhodium, gold, ruthenium, and the like.

In published U.S. patent application 20030011943 by Webb, et al., Jan. 16, 2003, various embodiments of spin valve sensors with overlaid leads are described. A first embodiment for a bottom spin valve deposits a cap layer over the sensor then "notches" to expose the outer edges of the sensor. The overlaid leads are deposited in contact with the exposed side of the sensors. A second embodiment "notches" down through the free layer and the cap and then refills with copper and NiFe before depositing the overlaid leads. A third embodiment "notches" down through the free layer and partially into the spacer and refills with NiFe before depositing the overlaid leads. A fourth embodiment "notches" down through the free layer and completely through the spacer and refills with NiFe before depositing the overlaid leads. A top spin valve embodiment notches through the cap, antiferromagnetic (AFM) layer and optionally into or through the pinned layer before forming the leads that contact the pinned layer.

Published U.S. patent application 20050007706 by Dovek, et al., Jan. 13, 2005 describes a design in which an additional antiferromagnetic layer is added under the overlaid leads in a bottom spin valve design. The extra antiferromagnetic layer extends over the hardbias pads onto the top of the spin valve and is coterminous with the lead material. The longitudinal bias provided by the hardbias pads extends, it is said, without attenuation right up to the edges of the leads, so that the physical and magnetic widths of the sensor are essentially identical.

Lin, et al. (U.S. Pat. No. 6,729,014) describe a method for forming a top spin-valve with synthetic antiferromagnetic pinned layer (SyAP) GMR read sensor having a conductive lead overlay configuration that contacts the sensor at a position within the SyAP pinned layer. This is said to simultaneously assure improved electrical contact and destroy the GMR properties of the sensor at the junction to improve the definition of the sensor track width.

Shukh, et al. (U.S. Pat. No. 6,704,176) describe a spin valve sensor that includes free and pinned ferromagnetic (FM) layers, a conducting layer, contact leads, free layer biasing elements, and an antiferromagnetic (AFM) layer. The pinned layer has opposing ends, which define a width of an active region of the spin valve sensor having a giant magnetoresistive effect in response to applied magnetic fields. The free layer is positioned below the pinned layer and has opposing ends that extend beyond the active region. The contact leads abut the pinned layer and overlay portions of the conducting layer. The free layer biasing elements abut the ends of the free layer and bias a magnetization of the free layer in a longitudinal direction.

Damage to the edges of the sensor is believed to cause some signal loss in the free layer. The damage occurs during the track-width definition process. One way to avoid this damage is to have the physical edge of the free layer extended beyond the track-width region and define the read-width by magnetic or electrical means. These designs have been described in the prior art as exchange tab and lead overlay designs, respectively. However, these designs are known to have significant side-reading, making them unsuitable for very narrow track applications.

SUMMARY OF THE INVENTION

An embodiment of the invention includes a lead overlay design with sensor and free layer dimensions such that the free layer is stabilized by the large demagnetization field due to the shape anisotropy. The width of the sensor should be at least 3 times the distance between the overlaid leads. The stripe height is preferably less than 50 nm and much less than the relaxation length. The relaxation length is the characteristic distance that the flux from the media (disk) would propagate along the sensor. The sensor pinned layer net moment must be less than 10A magnetic equivalent. As a result, flux cannot easily propagate along the longitudinal direction, leading to narrower microtracks than achievable in the conventional lead overlay designs.

In one embodiment for a top spin valve sensor a mask defining the area between the overlaid leads is patterned. The giant magnetoresistive (GMR) effect in the area that will be under the leads is destroyed without damaging the free layer by removing the antiferromagnetic (AFM) and pinned layers above the free layer. The overlaid lead pads are deposited on the exposed spacer layer at the sides of the mask that defines the active region. A second mask, wider than the first, is formed over the active area and the selected portion of the lead pad material which is to remain. Milling around this second mask removes the exposed lead pad material and free layer material beyond the lead pads and, therefore, defines the width of the sensor. The hardbias structures are then formed at the sides of the sensor and further connections to the lead pads are formed.

In an alternative embodiment the order of the masks is reversed with the wider mask being formed first followed by milling down through the free layer. The narrower mask is then formed and the antiferromagnetic (AFM) and pinned layers are removed. The overlaid lead pads are formed at this stage.

In yet another alternative embodiment a layer of electrically insulating material is deposited over the sensor to encapsulate it after the first etching step and thereby insulate it from contact with the hardbias structures. This allows the current from the sensor to be channeled through the lead pads. In a variation of the encapsulation embodiment, the insulating material is also deposited under the lead pads so the electrical current is channeled through the active region of the sensor.

An embodiment with self-aligned leads is also described. The lead pads are formed from electrically conductive material deposited on the sidewalls of the narrower mask used to define the active area of the sensor between the overlaid leads. After the lead material in the field has been removed by anisotropic milling, a layer of insulating material is deposited to insulate the lead structures from the hardbias structures. A second layer of lead material is deposited over the insulating layer. This second layer of material makes electrical contact with the lead overlay pads on the sidewall of the mask.

DETAILED DESCRIPTION OF THE INVENTION AND THE PREFERRED EMBODIMENTS

One embodiment of the invention includes a lead overlay design with sensor and free layer dimensions such that the free layer is stabilized by the large demagnetization field due to the shape anisotropy. The width of the sensor should be at least 3 times the distance between the overlaid leads. The stripe height must be less than 50 nm and much less than the relaxation length. The relaxation length is the characteristic distance that the flux from the media (disk) would propagate along the sensor. It is given by square root of (free layer permeability*freelayer thickness*readgap/2). The sensor pinned layer net moment must be less than 10A magnetic equivalent. As a result, flux cannot easily propagate along the longitudinal direction, leading to narrower microtracks than achievable in the conventional lead overlay designs.

If giant magnetoresistive (GMR) material remains in the area under the leads, the active sensor region extends well beyond the desired track-width region. Therefore, there will be some response in the sensor by adjacent tracks, although this should be heavily shunted by the overlaid leads, and this perturbation does not propagate to the center of the track due to the above described large demagnetization field. However, the lead overlaid region is now significantly larger than the track-width (3-10×).

Therefore, it is desirable to destroy the giant magnetoresistive (GMR) material in the area under the leads, without damaging the free layer. This can be done in a top spin valve by removing the antiferromagnetic (AFM) and pinned layers above the free layer. The antiferromagnetic (AFM) and pinned layers above the free layer can be etched off with minimal damage to the free layer using an first etch mask, which is formed on the completed top spin-valve, of width equal to the desired final lead-to-lead spacing. The first mask determines the active area of the sensor. The etching process is allowed to remove the exposed areas of the pinned and antiferromagnetic (AFM) layers, but the spacer layer on top of the free layer is not removed. The overlaid lead pads are then deposited on the exposed spacer layer at the sides of the mask. After the first mask is removed, a second mask, wider than the first, is formed over the active area and the selected portion of the lead pad material which is to remain. Milling around this second mask removes the exposed lead pad material and free layer material beyond the lead pads and, therefore, defines the width of the sensor. The hardbias structures are then formed at the sides of the sensor and further connections to the lead pads for formed.

Figure 3:
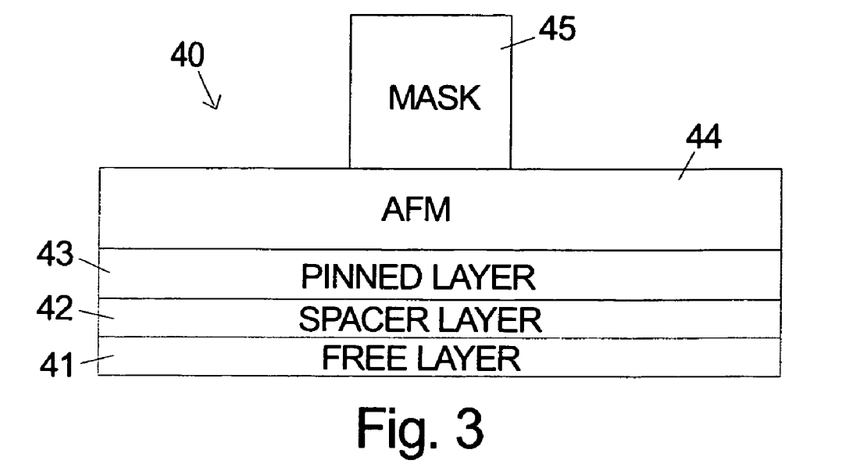
FIG. 3 is a symbolic illustration of a section view of a wafer, taken perpendicular to the planar surface, at a first stage in a process of fabricating a sensor with overlaid leads according to the invention.

FIG. 3 is a symbolic illustration of a plan view of a wafer 40 at a first stage in a process of fabricating a sensor with overlaid leads according to the invention. The figures are not according to scale, since the large range of sizes would make the drawings unclear. Except were noted the dimensions are according to the prior art. The stack of sensor material layers have been deposited full-film on the wafer at this point in the process. Only one sensor is shown but typically many sensors are formed simultaneously on a single wafer. Only the upper layers of the sensor are shown. The free layer 41 has a spacer layer 42 deposited on it. The spacer layer 42 is typically electrically conductive copper. The pinned layer 43 is next followed by the antiferromagnetic (AFM) layer 44. A first mask or photoresist pad 45 has been patterned in preparation for milling the areas where the overlaid lead pads will be formed. The mask 45 is patterned over the approximate center of the sensor to define the active region of the sensor that will lie substantially symmetrical between the overlaid lead pads.

Figure 4:
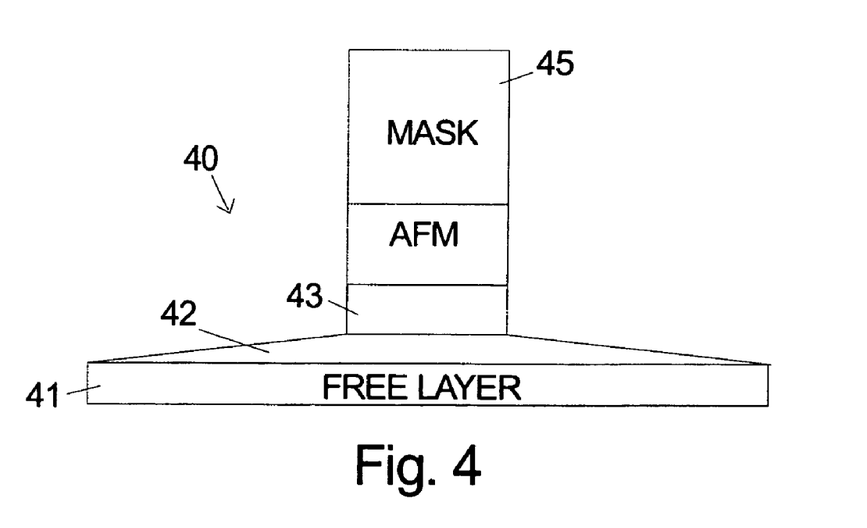
FIG. 4 is a symbolic illustration of a section, taken perpendicular to the surface of a wafer, subsequent to the stage of the process shown in FIG. 3, after the layers above the free layer have been milled according to the invention.

FIG. 4 shows the state of the wafer after the first milling step which is typically ion milling or reactive ion etching. The exposed areas of the antiferromagnetic (AFM) layer 44 and the pinned layer 43 have been completely removed, but only a portion of the spacer layer 42 has been removed. None of the free layer 41 has been removed. The goal is to destroy the giant magnetoresistive (GMR) response outside of the selected active area of the sensor with minimal damage to the free layer.

Figure 5:
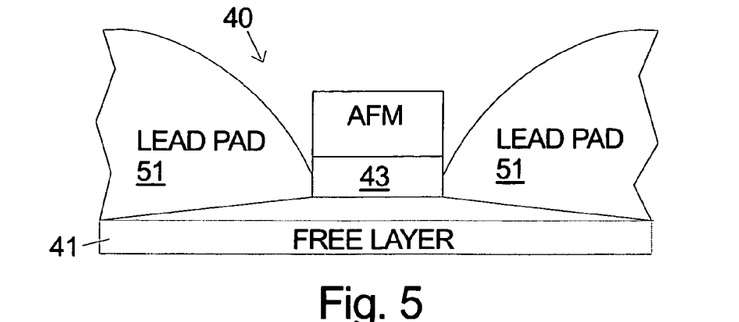
FIG. 5 is a symbolic illustration of a section, taken perpendicular to the surface of a wafer, subsequent to the state shown in FIG. 4, after the lead pads have been deposited according to an embodiment of the invention.

FIG. 5 shows the state of the wafer after the conductive material for the overlaid lead pads 51 has been deposited on the wafer with mask 45 in place. The mask 45 and the excess lead material are removed. A chemical-mechanical-polishing (CMP) step can be used if appropriate.

Figure 6:
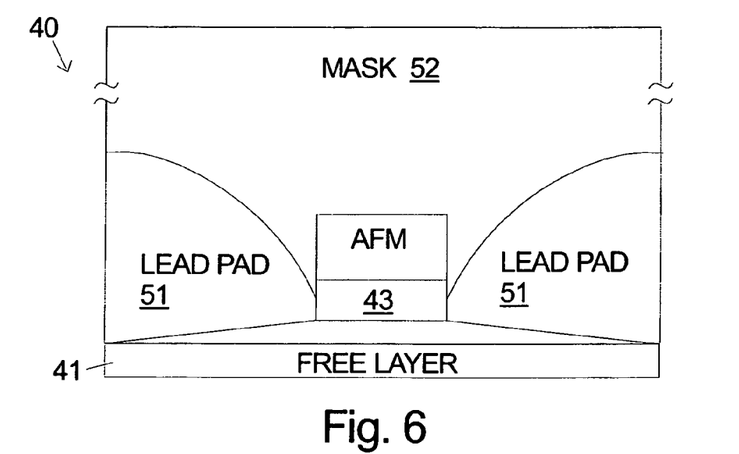
FIG. 6 is a symbolic illustration of a section, taken perpendicular to the surface of a wafer, subsequent to the state shown in FIG. 5, after a second mask has been patterned and the exposed portions of the lead pads and the free layer have been removed according to an embodiment of the invention.

FIG. 6 shows the state of the wafer after the second mask 52 has been patterned to define the width of the sensor. The second mask 52 is wider than the first mask and extends to cover predetermined portions of the lead pads 51 that will remain in the final sensor. The width of the second mask determines the spacing between the hardbias structures that will be formed after milling. As shown the second milling step has already been performed. The second milling step removed the exposed (unmasked) material in the lead pads 51, the spacer layer 42 and the free layer 41.

Figure 7:
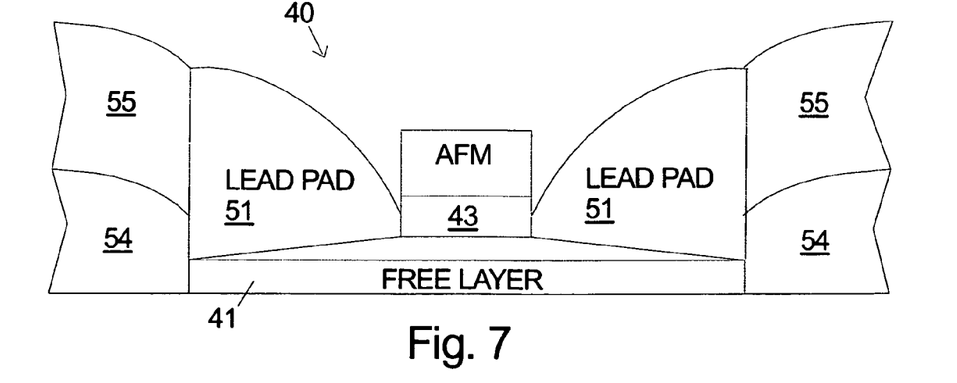
FIG. 7 is a symbolic illustration of a section, taken perpendicular to the surface of a wafer, subsequent to the state shown in FIG. 6, after the hardbias structures and additional lead structures have been formed according to an embodiment of the invention.

FIG. 7 shows the state of the wafer after the second mask 52 has been removed, the hardbias structures 54 have been formed and the second set of leads 55 have been formed. The hardbias structures 54 are formed according to the prior art prior to the removal of the second mask. The internal layers of the hardbias structures are according to the prior art. In the embodiment shown the hardbias structures are in contact with the free layer. The second set of leads 55 are formed on the hardbias structures 54. The second set of leads 55 make electrical contact with the lead pads 51 to continue the process of building connections to the leads to the outside of the head.

After the second set of leads are formed the second mask is removed and the prior art process of making the sensor can be resumed.

The order of the milling steps can be reversed in a second alternative embodiment. In this alternative embodiment the wider mask is formed first and the milling through to the free layer is performed. The hardbias and second lead structures are formed with the wider mask in place. The wide mask is removed and replaced with a narrower mask that defines the active area of the sensor and protects the leads already deposited. The narrower mask is used to mill down to the spacer layer. The lead pads are then formed between the second lead structures 55 and the antiferromagnetic (AFM) and pinned layer to achieve the same final result shown in FIG. 7.

Figure 8A:
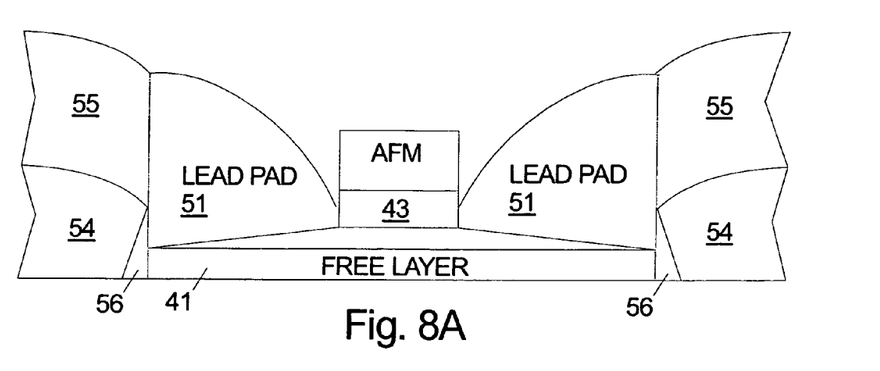
FIG. 8A is a symbolic illustration of a section, taken perpendicular to the surface of a wafer, showing the embodiment using encapsulation of the sensor to insulate the hardbias structures from the sensor according to an embodiment of the invention.
Figure 8B:
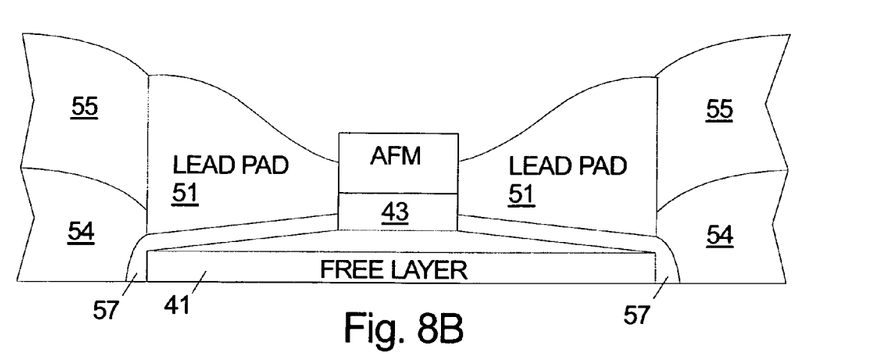
FIG. 8B is a symbolic illustration of a section, taken perpendicular to the surface of a wafer, showing the embodiment using encapsulation of the sensor to insulate the hardbias structures and the underside of the lead pads from the sensor according to an embodiment of the invention.

In a third alternative embodiment the current is channeled more effectively into the leads by encapsulating the sensor in insulating material prior to forming the hardbias structures. Electrically insulating oxides are appropriate materials for this purpose. Two versions of encapsulation are shown in FIGS. 8A and 8B. In FIG. 8A the sensor structure is very similar to the one shown in FIG. 7, but insulating material 56 has been deposited on the end of free layer 41 prior to the hardbias structures 54. This prevents current from flowing through the hardbias structures 54 into the leads. The current is channeled through lead pad 51. In FIG. 8B the insulating material 57 is deposited over the top of the etched portion of the sensor to confine the electrical current even more. In this embodiment the current flows from the antiferromagnetic (AFM) 44 and pinned layer 43 into lead pad 51.

Embodiment Using Self-Aligning Lead Pads

Figure 9:
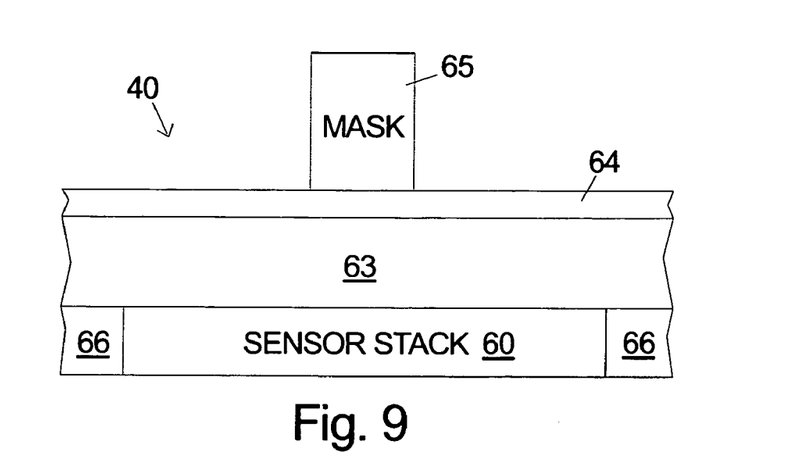
FIG. 9 is a symbolic illustration of a section, taken perpendicular to the surface of a wafer, at a first stage in a process of fabricating a sensor with self-aligning overlaid lead pads according to an embodiment of the invention.

In a fourth embodiment of the invention the lead pads are self-aligned by being formed as tabs on the sidewalls. The dimensions are determined by the deposition process not by lithography. FIG. 9 shows a wafer at an initial stage of the process according to the invention. The multiple layers in the sensor stack 60 have been deposited on the wafer and the hardbias structures 66 have been formed according to the prior art. A layer of dielectric material 63 such as SiO2 or hard-baked resist has been deposited full film over the wafer. On top of the layer of dielectric material 63, a CMP stop layer 64, preferably of carbon, has been deposited. A mask pad 65 has been patterned over the predetermined active area the sensor. This mask pad determines the separation between the lead pads.

Figure 10:
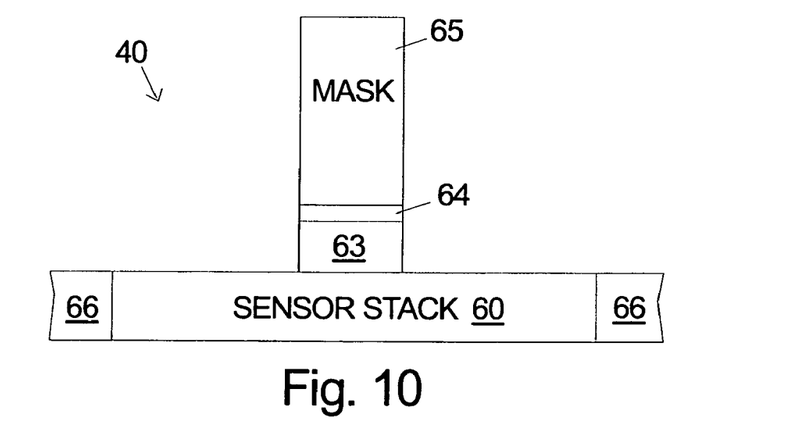
FIG. 10 is a symbolic illustration of a section, taken perpendicular to the surface of a wafer, at a stage subsequent to that shown in FIG. 9 in a process of fabricating a sensor with self-aligning overlaid lead pads according to an embodiment of the invention.

FIG. 10 illustrates a subsequent stage in the process after milling of the exposed areas around the mask. The CMP stop layer 64 and the layer of dielectric material 63 have been removed except in the area under the mask pad.

Figure 11:
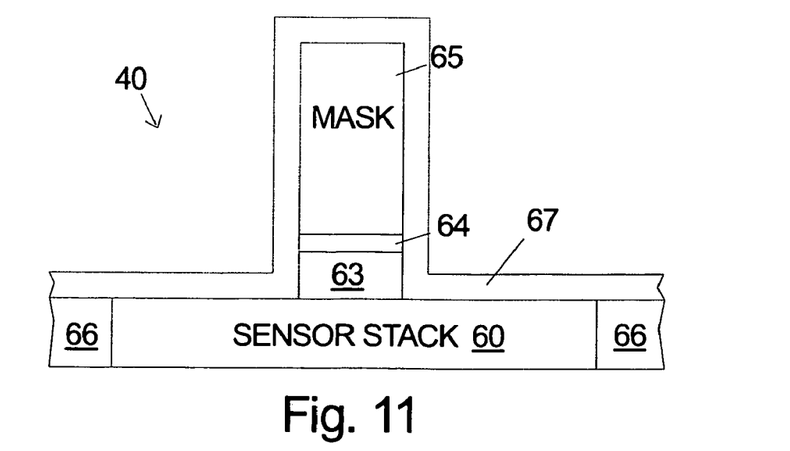
FIG. 11 is a symbolic illustration of a section, taken perpendicular to the surface of a wafer, at a stage subsequent to that shown in FIG. 10 in a process of fabricating a sensor with self-aligning overlaid lead pads according to an embodiment of the invention.

FIG. 11 illustrates a subsequent stage in the process after a layer of lead material 67 has been deposited. The material for the leads must be electrically conductive and suitable for removal using a reactive-ion etching (RIE) process. Examples of suitable material include tantalum (Ta), tungsten (W) and TaW.

Figure 12:
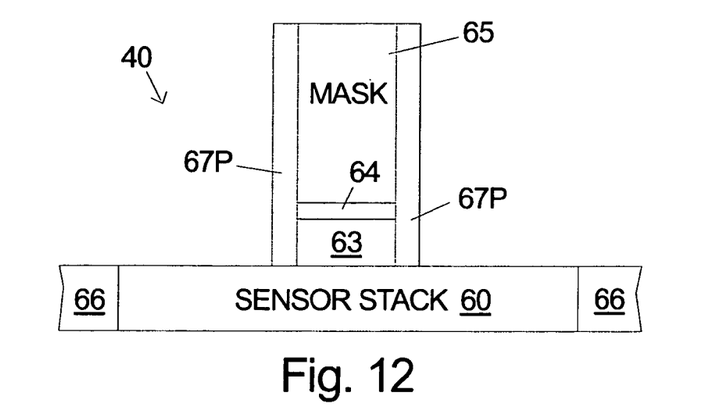
FIG. 12 is a symbolic illustration of a section, taken perpendicular to the surface of a wafer, at a stage subsequent to that shown in FIG. 11 in a process of fabricating a sensor with self-aligning overlaid lead pads according to an embodiment of the invention.

FIG. 12 illustrates a subsequent stage in the process after lead material has been removed except on the sidewalls of the mask pad. The lead material on the sidewalls forms lead pads 67P. Anisotropic etching is used to preferentially remove the horizontal field areas of the conductive lead material. Preferably reactive-ion etching (RIE) is used for the step of the process.

Figure 13:
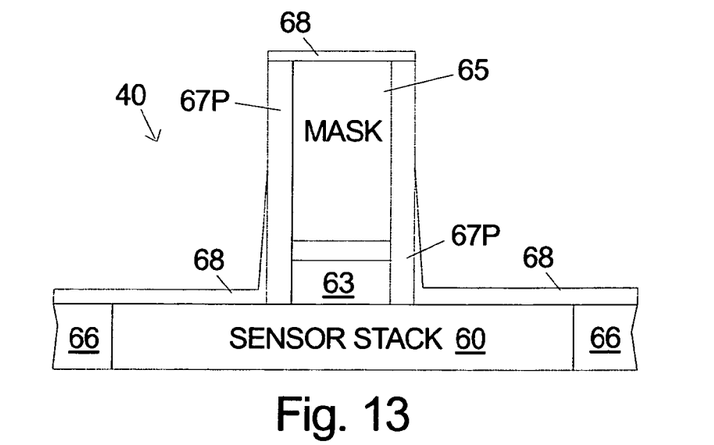
FIG. 13 is a symbolic illustration of a section, taken perpendicular to the surface of a wafer, at a stage subsequent to that shown in FIG. 12 in a process of fabricating a sensor with self-aligning overlaid lead pads according to an embodiment of the invention.
Figure 14:
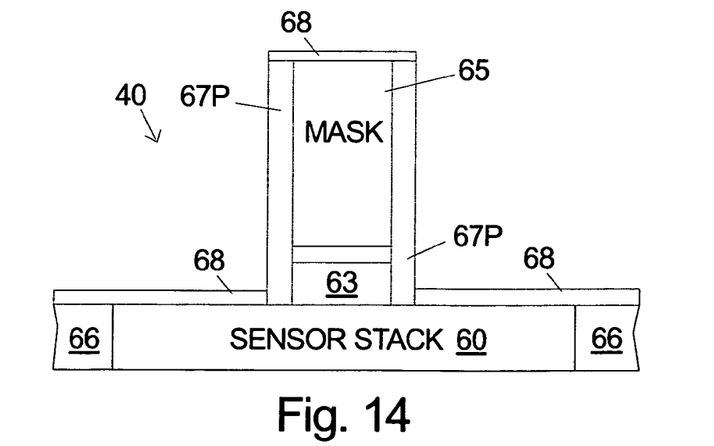
FIG. 14 is a symbolic illustration of a section, taken perpendicular to the surface of a wafer, at a stage subsequent to that shown in FIG. 13 in a process of fabricating a sensor with self-aligning overlaid lead pads according to an embodiment of the invention.

FIG. 13 illustrates a subsequent stage in the process after a thin layer of insulating material 68 has been deposited. A suitable material for this layer is Al2O3. The next step of the process removes the insulator from the sidewalls of the lead pads 67P. The result is shown in FIG. 14. Milling at an appropriate angle can be used to remove to the insulator from the sidewalls while leaving sufficient insulating material in the field.

Figure 15:
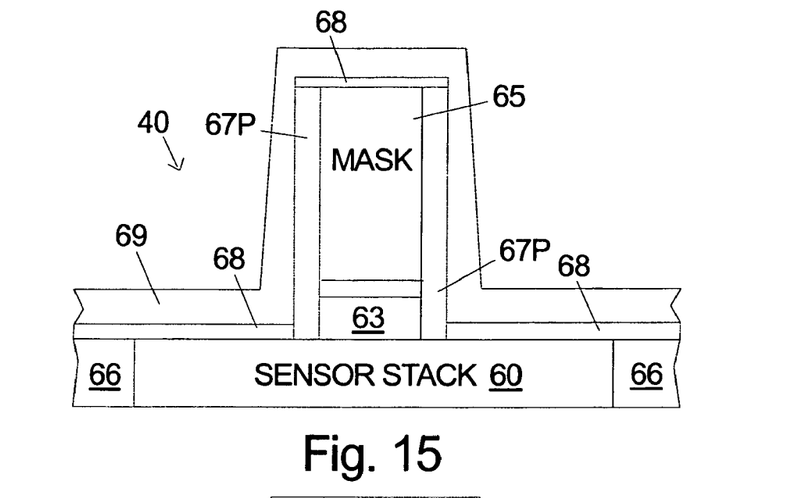
FIG. 15 is a symbolic illustration of a section, taken perpendicular to the surface of a wafer, at a stage subsequent to that shown in FIG. 14 in a process of fabricating a sensor with self-aligning overlaid lead pads according to an embodiment of the invention.
Figure 16:
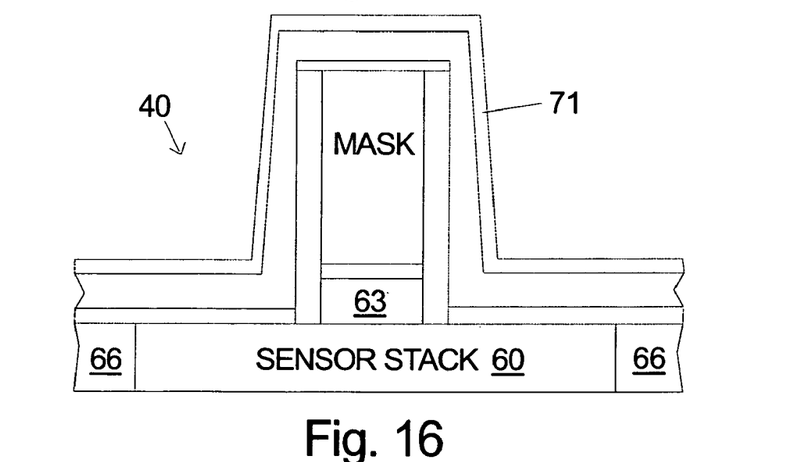
FIG. 16 is a symbolic illustration of a section, taken perpendicular to the surface of a wafer, at a stage subsequent to that shown in FIG. 15 in a process of fabricating a sensor with self-aligning overlaid lead pads according to an embodiment of the invention.
Figure 17:
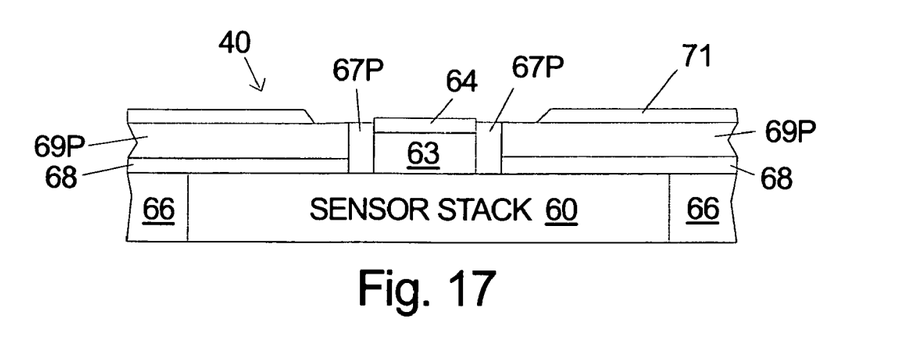
FIG. 17 is a symbolic illustration of a section, taken perpendicular to the surface of a wafer, at a stage subsequent to that shown in FIG. 16 in a process of fabricating a sensor with self-aligning overlaid lead pads according to an embodiment of the invention.

A layer of electrically conductive material 69 to provide electrical connection to the lead pads is deposited as shown in FIG. 15. This layer is preferably rhodium, but other electrically conductive materials can be used as well. A layer of material for a CMP-stop layer 71 is deposited next as shown in FIG. 16. A CMP liftoff is preformed to remove the mask and excess materials. The result is shown in FIG. 17. Lead pads 69P remain in contact with the overlaid lead pads 67P. Insulating layer 68 insulates the leads from the hardbias structures 66. This channels the current into the lead pads 67P.

Figure 18:
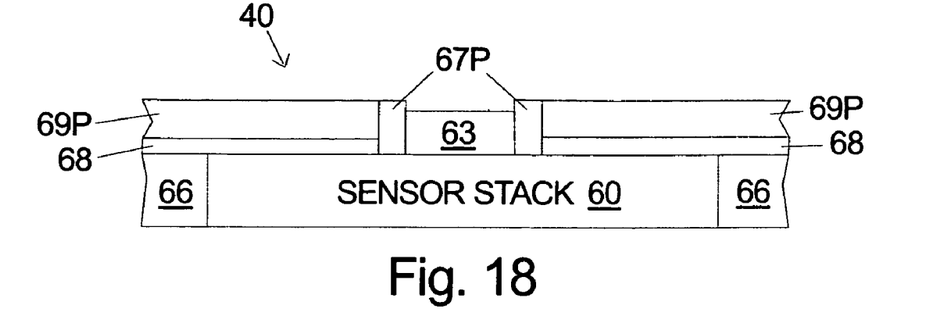
FIG. 18 is a symbolic illustration of a section, taken perpendicular to the surface of a wafer, at a stage subsequent to that shown in FIG. 17 in a process of fabricating a sensor with self-aligning overlaid lead pads according to an embodiment of the invention.

The CMP stop layer 71 and the remain portion of the CMP stop layer 64 are removed preferably by a RIE process. The resulting structure is shown in FIG. 18.

Composite Embodiment

Figure 19:
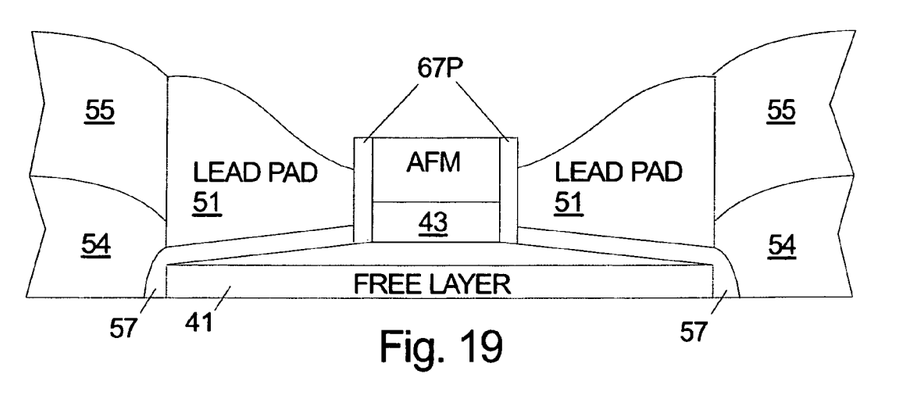
FIG. 19 is a symbolic illustration of a section, taken perpendicular to the surface of a wafer, showing an embodiment using encapsulation of the sensor, self-aligning lead pads and removal of the antiferromagnetic (AFM) and pinned layers outside of the active area of the sensor according to the invention.

FIG. 19 is a symbolic illustration of a section, taken perpendicular to the surface of a wafer, showing an embodiment using encapsulation of the sensor, self-aligning lead pads and removal of the antiferromagnetic (AFM) and pinned layers outside of the active area of the sensor according to the invention. The sensor is similar to the embodiment shown in FIG. 8B, but the overlaid lead pad 67P have been formed on the sidewall of the antiferromagnetic (AFM) 44 and pinned layers 43 prior to deposition of the encapsulation layer 57.

The invention has been described with respect to particular embodiments, but other uses and applications for the thin film structures according to the invention will be apparent to those skilled in the art.

The invention claimed is:

1. A magnetic sensor comprising:
   first and second lead pads disposed on opposing sides of an active region of the magnetic sensor;
   an antiferromagnetic layer disposed between the first and second lead pads;
   a free layer extending beneath the first and second lead pads, the free layer being wider than the antiferromagnetic layer and extending outside of the active region of the magnetic sensor; and
   first and second hardbias structures on opposing sides of the free layer and first and second sections of electrically insulating material separating the first and second hardbias structures from the free layer and separating the first and second lead pads from the free layer.

2. The magnetic sensor of claim 1 wherein a sensor stripe height is less than 50 nm and less than a relaxation length.

3. The magnetic sensor of claim 1 wherein width of the magnetic sensor is greater than or equal to a distance between the first and second lead pads.

4. The magnetic sensor of claim 1 wherein a width of the active region of the magnetic sensor corresponds to a width of the antiferromagnetic layer.

5. A magnetic sensor comprising:
   first and second sidewall lead pads disposed on opposing sides of an active region of the magnetic sensor, the first and second sidewall lead pads being electrically conductive material deposited onto sidewalls of a pad of material located over the active region;
   first and second lead pads disposed on opposing sides of an active region of the magnetic sensor, the first and second lead pads being electrically conductive material in contact with the first and second sidewall lead pads respectively;

an antiferromagnetic layer disposed between the first and second lead pads;

a free layer extending beneath the first and second lead pads, the free layer being wider than the antiferromagnetic layer and extending outside of the active region of the magnetic sensor; and a layer of electrically insulating material separating the first and second lead pads from electrical contact with the magnetic sensor except through the first and second sidewall lead pads.

6. The magnetic sensor of claim 5 wherein the pad of material located over the active region is dielectric material.

7. The magnetic sensor of claim 5 wherein a sensor stripe height is less than 50 nm and more than a relaxation length.

8. The magnetic sensor of claim 5 wherein a width of the magnetic sensor is greater than or equal to a distance between the first and second lead pads.

9. The magnetic sensor of claim 5 further comprising first and second hardbias structures on opposing sides of a free layer and first and second sections of electrically insulating material separating the first and second hardbias structures from the free layer.

10. The magnetic sensor of claim 5 further comprising first and second sections of electrically insulating material separating first and second hard bias structures and first and second lead pads from the free layer.

11. A magnetic sensor of comprising:

first and second sidewall lead pads disposed on opposing sides of an active region of the magnetic sensor, the first and second sidewall lead pads being electrically conductive material deposited onto sidewalls of a pad of material located over the active region, the pad of material containing an antiferromagnetic layer, and wherein a width of the active region of the magnetic sensor corresponds to a width of the antiferromagnetic layer;

first and second lead pads disposed on opposing sides of an active region of the magnetic sensor, the first and second lead pads being electrically conductive material in contact with the first and second sidewall lead pads respectively; and a layer of electrically insulating material separating the first and second lead pads from electrical contact with the magnetic sensor except through the first and second sidewall lead pads.

12. A magnetic sensor comprising:

first and second sidewall lead pads disposed on opposing sides of an active region of the magnetic sensor, the first and second sidewall lead pads being electrically conductive material deposited onto sidewalls of a pad of material that includes an antiferromagnetic layer defining the active region;

first and second lead pads disposed on opposing sides of an active region of the magnetic sensor, the first and second lead pads being electrically conductive material in contact with the first and second sidewall lead pads respectively; and a layer of electrically insulating material separating the first and second lead pads from electrical contact with the magnetic sensor except through the first and second sidewall lead pads.

13. The magnetic sensor of claim 12 wherein the pad of material includes a pinned layer of the magnetic sensor.

14. The magnetic sensor of claim 12 further comprising an antiferromagnetic layer of the magnetic sensor disposed between the first and second sidewall lead pads; and a free layer extending beneath the first and second lead pads, the free layer being wider than the antiferromagnetic layer and extending outside of the active region of the magnetic sensor.

15. The magnetic sensor of claim 12 wherein a sensor stripe height is less than 50 nm and more than a relaxation length.

16. The magnetic sensor of claim 12 wherein width of the magnetic sensor is greater than or equal to a distance between the first and second sidewall lead pads.

17. The magnetic sensor of claim 12 further comprising first and second hardbias structures on opposing sides of a free layer and first and second sections of electrically insulating material separating the first and second hardbias structures from the free layer.

* * * * *